United States Patent [19]
Johnston et al.

[11] Patent Number: 5,717,764
[45] Date of Patent: Feb. 10, 1998

[54] GLOBAL MASKING THRESHOLDING FOR USE IN PERCEPTUAL CODING

[75] Inventors: James David Johnston, Warren; Deepen Sinha, Chatham, both of N.J.

[73] Assignee: Lucent Technologies Inc., Murray Hill, N.J.

[21] Appl. No.: 524,198

[22] Filed: Sep. 6, 1995

Related U.S. Application Data

[63] Continuation-in-part of Ser. No. 156,495, Nov. 23, 1993.

[51] Int. Cl.$^6$ ............................... H04H 5/00; G10L 3/02
[52] U.S. Cl. ............................. 381/2; 395/2.35; 395/2.36
[58] Field of Search ....................... 381/2, 94; 395/2.35, 395/2.36, 2.39, 2.1, 2.38

[56] References Cited

U.S. PATENT DOCUMENTS

| | | | |
|---|---|---|---|
| 4,896,362 | 1/1990 | Veldhuis et al. | 395/2.35 |
| 5,040,217 | 8/1991 | Brandenburg et al. | 381/47 |
| 5,245,662 | 9/1993 | Taniguchi et al. | 395/2.28 |
| 5,285,498 | 2/1994 | Johnston | 381/2 |
| 5,341,457 | 8/1994 | Hall, II et al. | 395/2.36 |
| 5,377,051 | 12/1994 | Lane et al. | 360/33.1 |
| 5,488,665 | 1/1996 | Jonnston et al. | 381/2 |
| 5,535,300 | 7/1996 | Hall, II et al. | 395/2.35 |

FOREIGN PATENT DOCUMENTS

| | | | |
|---|---|---|---|
| 93301433.4 | 2/1993 | European Pat. Off. | H04B 1/10 |
| 90 16136 | 12/1990 | WIPO | H04S 1/00 |

OTHER PUBLICATIONS

Johnston, J. D., "Transform Coding of Audio Signals Using Perceptual Noise Criteria," *IEEE Journal on Selected Areas in Communications*, vol. 6, No. 2, 314–323 (Feb. 1988).

Johnston, J. D., "Estimation of Perceptual Entropy Using Noise Masking Criteria," *ICASSP* 1988.

Johnston, J. D., "Perceptual Transform Coding of Wideband Stereo Signals," *ICASSP, 1989, IEEE International Conference on Acoustics, Speech and Signal Processing*.

Schroeder, E. F. et al., "MSC–Stereo Audio Coding with CD–Quality and 256 KBIT/SEC," *IEEE Trans. on Consumer Electronics*, vol. CE–33, No. 4, pp. 512–519 (Nov. 1987).

Theile, G. et al., Institut fur Rundfunktechnik Munich, Germany, "MUSICAM–Surround: A Universal Multi–Channel Coding System Compatible with ISO 11172–3," *AES, Audio Engineering Society*, 93rd Convention, San Francisco, CA, Oct. 1–4, 1992.

Davis, M. et al., "The AC–3 Multichannel Coder," *AES, Audio Engineering Society*, 95th Convention, N.Y. Oct. 7–10, 1993.

Th. ten Kate, W. R., "Matrixing of Bit Rate Reduced Audio Signals," *ICASSP–92 IEEE International Conference on Acoustics, Speech and Signal Processing*, vol. 2, pp. 205–208 (Mar. 23–26, 1992).

*Primary Examiner*—Curtis Kuntz
*Assistant Examiner*—Xu Mei
*Attorney, Agent, or Firm*—Ronald D. Slusky; Donald P. Dinella

[57] ABSTRACT

A five-channel perceptual audio compression system which encodes five matrixed channels switches among a fourteen encoding modes each utilizing a respective different set of matrixed channels. Six of the modes are for encoding the three front channels and eight of the modes are for encoding the two back channels. The rate of perceptual encoding the matrixed channels is controlled by adjusting individual noise thresholds as a function of a global masking threshold.

8 Claims, 3 Drawing Sheets

GLOBAL MASKING THRESHOLDING FOR USE IN PERCEPTUAL CODING

CROSS-REFERENCE TO RELATED APPLICATION

This is a Continuation-In-Part of U.S. patent application Ser. No. 08/156,495 filed on Nov. 23, 1993.

BACKGROUND OF THE INVENTION

The present invention relates to the processing of information signals and, more particularly, to techniques for efficiently encoding audio signals, including signals representative of voice and music.

A significant amount of effort has been directed in recent years to so-called perceptual audio coding, or PAC. In accordance with this technique, each of a succession of time domain blocks of an audio signal is coded in the frequency domain. Specifically, the frequency domain representation of each block is divided into coder bands, each of which is individually coded, based on psycho-acoustic criteria, in such a way that the audio signal is significantly "compressed," meaning that the number of bits required to represent the audio signal is significantly less than would be the case if the audio signal were represented in a more simplistic digital format, such as in the form of PCM words.

When the audio signal comprises two or more input channels, such as the left and right channels of stereophonic (stereo) music, the above-described perceptual coding is carried out on a like number of so-called matrixed channels. In the most straightforward implementation, each matrixed channel is directly derived from a respective input channel. Thus in the stereo music case, for example, this would mean that the perceptual coding codes the frequency domain representation of the left stereo input channel over time, denoted herein as "L", and, separately, the frequency domain representation of the right stereo input channel over time, denoted herein as "R". However, further compression can be achieved when the input channels are highly correlated with one another—as, indeed, is almost always the case with stereo music channels—by switching the coding carried out for each coder band between two coding modes in which different sets of matrixed channels are used. In one of the modes, the set of two matrixed channels simply comprises the input channels L and R. In the other mode, the set of two matrixed channels comprises S=(L+R)/2 and D=(L–R)/2. The S and D channels are referred to as sum/difference channels. This technique is taught in U.S. patent application Ser. No. 07/844,804 entitled "Method and Apparatus for Coding Audio Signals Based on a Perceptual Model" filed Mar. 2, 1992, allowed Aug. 11, 1993, now U.S. Pat. No. 5,285,498 issued Feb. 8, 1994, to J. D. Johnston, hereinafter referred to as "the Johnston patent," and hereby incorporated by reference.

A problem arises in PAC systems when the PAC coder output bit rate over some period of time is sufficiently higher than average that the capacity of the system to buffer those bits threatens to be completely used up. This situation is referred to as "bit reservoir depletion" and, if not dealt with, can lead to the loss of PAC-encoded information and, thus, distortion in the decoded signal. The prior art deals with this problem by increasing, by a multiplicative factor, the so-called noise thresholds used to encode at least a particular coder band. These thresholds determine the coarseness or fineness with which the PAC data within a band are quantized. Thus increasing the thresholds lowers the number of bits that are used to represent the matrixed channels and therefore ameliorates the bit reservoir depletion problem.

SUMMARY OF THE INVENTION

While the above-described prior art approach is effective in dealing with bit reservoir depletion, it can lead to severe artifacts in the decoded signal since the mechanism for increasing the thresholds is deterministic across the coder bands rather than being, as we have realized is advantageous, based on psycho-acoustic considerations.

The present invention is directed to an approach to the bit reservoir depletion issue which takes psycho-acoustic considerations into account. Specifically, when the level of bit depletion reaches a predetermined level, any threshold specified by the PAC encoding for a particular coder band which is less than a particular lower bound defined for that band is increased so as to be equal to that lower bound. The lower bound, in turn, is a particular percentage of a "global masking threshold" determined for each coder band.

If at a subsequent time it is observed that the bit reservoir reaches an even more severe state of depletion, a higher percentage of the global masking threshold is established as the lower bound, causing a further increase in various ones of the thresholds. If, ultimately, the lower bound needs to be established at 100 percent of the full global masking threshold and bit reservoir depletion still continues, each of the thresholds is further increased to a value given by a constant >1 times the relevant global masking threshold value. Once the bit reservoir begins to rebuild, lower and lower percentages of the global masking threshold are used for determining the noise threshold lower bounds until, ultimately, the thresholds are returned to their standard values.

In preferred embodiments, the value of the global masking threshold for each coder band is taken to be the maximum of all of the noise thresholds applicable to that band minus a safety margin. The safety margin, in turn, is taken to be the so-called frequency dependent binaural masking level difference, or MLD, as defined in the Johnston patent, plus a constant 4–5 dB.

DETAILED DESCRIPTION

To simplify the present disclosure, the following patents, patent applications and publications are hereby incorporated by reference in the present disclosure as if fully set forth herein: U.S. Pat. No. 5,040,217, issued Aug. 13, 1991 by K. Brandenburg et al; U.S. patent application Ser. No. 07/292,598, entitled *Perceptual Coding of Audio Signals*, filed Dec. 30, 1988; J. D. Johnston, *Transform Coding of Audio Signals Using Perceptual Noise Criteria*, IEEE Journal on Selected Areas in Communications, Vol. 6, No. 2 (February 1988); International Patent Application (PCT) WO 88/01811, filed Mar. 10, 1988; U.S. patent application Ser. No. 07/491,373, entitled *Hybrid Perceptual Coding*, filed Mar. 9, 1990, Brandenburg et al, *Aspec: Adaptive Spectral Entropy Cod-*

*ing of High Quality Music Signals*, AES 90th Convention (1991); Johnston, J., *Estimation of Perceptual Entropy Using Noise Masking Criteria*, ICASSP, (1988); J. D. Johnston, *Perceptual Transform Coding of Wideband Stereo Signals*, ICASSP (1989); E. F. Schroeder and J. J. Platte, "'MSC': Stereo Audio Coding with CD-Quality and 256 kBIT/SEC," IEEE Trans. on Consumer Electronics, Vol. CE-33, No. 4, November 1987; and Johnston, *Transform Coding of Audio Signals Using Noise Criteria*, Vol. 6, No. 2, IEEE J.S.C.A. (February 1988).

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. Illustrative embodiments may comprise digital signal processor (DSP) hardware, and software performing the operations discussed below. Very large scale integration (VLSI) hardware embodiments of the present invention, as well as hybrid DSP/VLSI embodiments, may also be provided.

Figure 1:
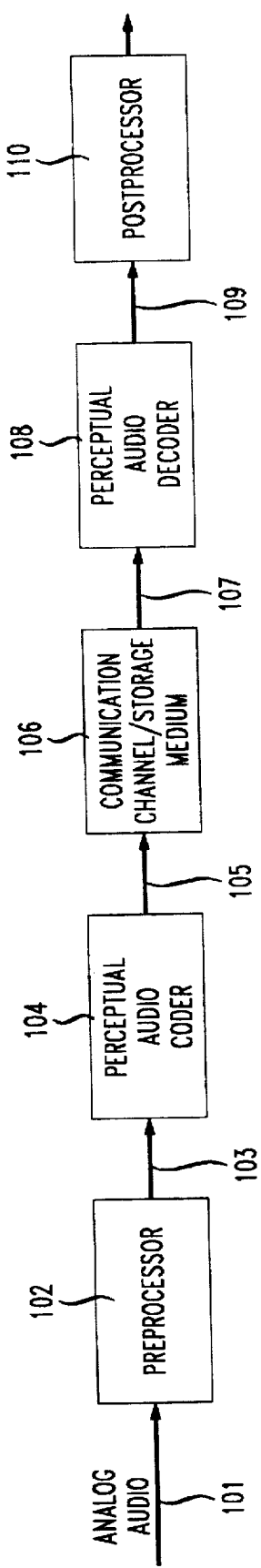
FIG. 1 is a block diagram of a system in which the present invention is illustratively implemented.

FIG. 1 is an overall block diagram of a system in which the present invention is implemented. In FIG. 1, an analog audio signal on lead 101 is fed into a preprocessor 102 where it is sampled (typically at 48 KHz) and converted into a 16-bit-per-sample digital pulse code modulation ("PCM") signal on lead 103 in standard fashion. The PCM signal is fed into a perceptual audio coder ("PAC") 104 which compresses the PCM signal and outputs the compressed PAC signal on lead 105 to either a communications channel or a storage medium 106. The latter may be, for example, a magnetic tape, compact disc or other storage medium. From the communications channel or the storage medium the compressed PAC-encoded signal on lead 107 is fed into a perceptual audio decoder 108 which decompresses the compressed PAC-encoded signal and outputs a PCM signal on lead 109 which is a digital representation of the original analog signal. From the perceptual audio decoder, the PCM signal on lead 108 is fed into a post-processor 110 which creates an analog representation.

Figure 2:
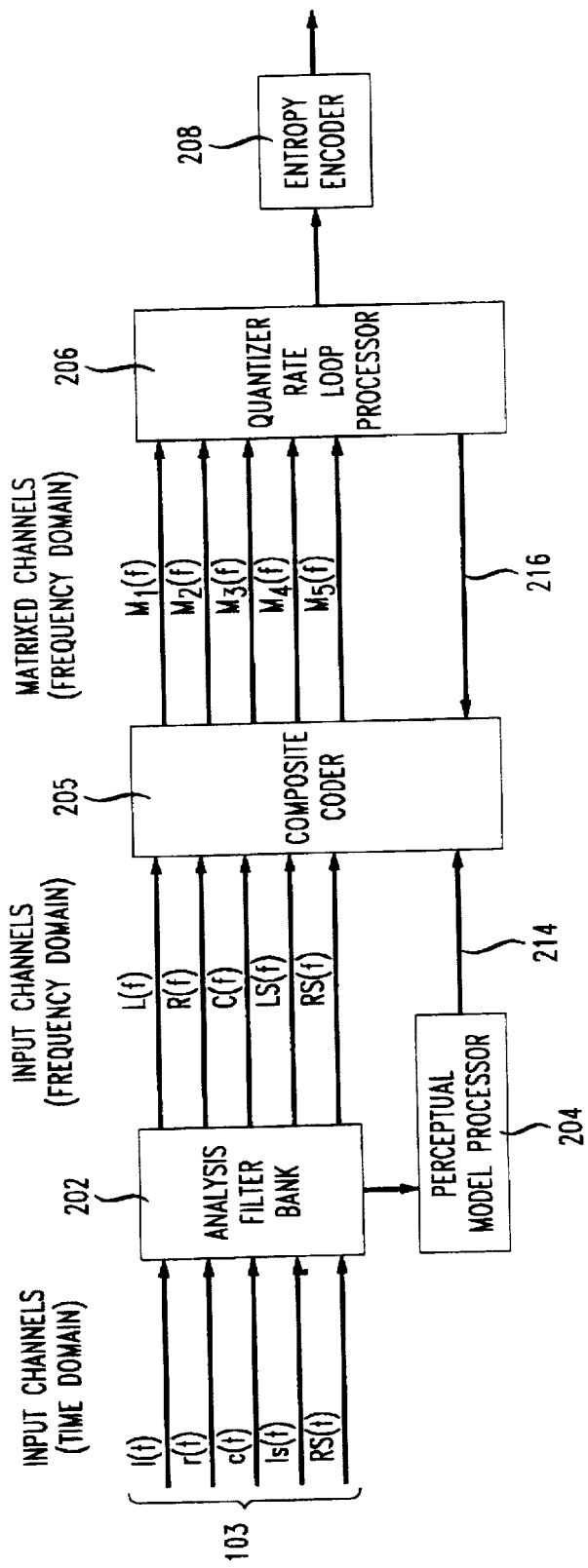
FIG. 2 is a block diagram of the perceptual audio coder used in the system of FIG. 1.

An illustrative embodiment of the perceptual audio coder 104 is shown in block diagram form in FIG. 2. The perceptual audio coder of FIG. 2 may advantageously be viewed as comprising an analysis filter bank 202, a perceptual model processor 204, a composite coder 205, a quantizer/rate-loop processor 206 and an entropy encoder 208.

The structure and operation of the various components of perceptual audio coder 104 are generally similar to the structure and operation of like components in FIG. 2 of the Johnston patent when processing stereo signals, and thus will not be described in detail herein except to the extent necessary for an explication of the present invention. This will include a description of composite coder 205, for which no explicit counterpart is shown in FIG. 2 of the Johnston patent (although its functionality—relating to the switching between coding modes—is implicitly carried out in the Johnston patent within analysis filter bank 202).

Turning, then, to FIG. 2 hereof, the analog audio input signal on lead 103 is illustratively a five-channel signal comprising, in the time domain, PCM samples of a set of input channels, those being left, right and center front channels and left surround and right surround back channels, denoted l(t), r(t), c(t), ls(t) and rs(t), respectively. Analysis filter bank 202 receives those samples and divides them into time domain blocks. More specifically, filter bank 202 switches between two window lengths for the blocks—a "short" window comprising 128 time samples and a "long" window comprising 1024 time samples. For each block, filter bank 202 performs a Modified Discrete Cosine Transform on each of the five channels separately to provide a frequency domain representation of each channel for the block in question. The frequency domain representation of each channel includes 1024 uniformly spaced frequency spectrum lines divided into 49 coder bands for the long-window-length blocks and 128 uniformly spaced frequency spectrum lines divided into 14 coder bands for the short-window-length blocks. The frequency domain representations of the left, right, center, left surround and right surround input channels are denoted in the FIG. as L(f), R(f), C(f), LS(f) and RS(f), but, for convenience, will be hereinafter denoted as L, R, C, LS and RS.

The outputs of analysis filter bank 202 are applied to composite coder 205 which in a manner described in detail below produces five matrixed channels $M_1(f)-M_5(f)$ which are applied to quantizer/rate loop processor 206. The latter encodes the matrixed channels by a) generating binary data representing the signed magnitude of each of the frequency spectrum lines of each matrixed channel for a given block and b) formatting that data along with other information needed by the decoder. That data includes various pieces of "housekeeping" data as described in the Johnston patent and also hereinbelow, as well as data including, for example, an indication of what coding mode was used to encode each coder band in a given block, as described below, as well as the values of certain prediction coefficients also described below.

The output of quantizer/rate loop processor 206 is applied to entropy encoder 208. The latter operates in conjunction with the former to achieve yet further compression.

As noted above, the output of composite coder 205 comprises five matrixed channels. Composite coder 205 has a number of coding modes each characterized by a different set of matrixed channels, the different coding modes being invoked individually for each coder band in a manner to be described. Some of the matrixed channels in some of the modes are the input channels L, R, C, LS and RS. Others of of the matrixed channels are the so-called sum/difference channels S=(L+R)/2, D=(L−R)/2, SS=(LS+RS)/2 and SD=(LS−RS)/2.

Moreover, at least one of the modes includes at least one matrixed channel given by an input channel or sum/difference channel from which has been subtracted a prediction of itself. In the present illustrative embodiment, six modes are provided for coding the front channels. Three, involving the front input channels L, R and C directly, are $$\left\{ \begin{array}{ccc} L, & R, & C \\ L-\hat{\alpha}C, & R-\hat{\beta}C, & C \\ L, & R, & C-\hat{\gamma}\hat{L}-\hat{\delta}\hat{R} \end{array} \right\} \quad (1)$$

The other three, involving the front sum/difference channels S and D, are $$\left\{ \begin{array}{ccc} S, & D, & C \\ S-\hat{\alpha}\hat{C}, & D-\hat{\beta}\hat{C}, & C \\ S, & D, & C-\hat{\gamma}\hat{L}-\hat{\delta}\hat{R} \end{array} \right\} \quad (2)$$

Eight modes are provided for the back channels. Four, involving the back channels LS and RS directly are $$\begin{Bmatrix} LS, & RS \\ LS - \hat{v}_1\hat{C}, & RS - \hat{v}_2\hat{C} \\ LS - \hat{\eta}_1\hat{L} - \hat{\kappa}_1\hat{R}, & RS - \hat{\eta}_2\hat{L} - \hat{\kappa}_2\hat{R} \\ LS - \hat{v}_1\hat{C} - \hat{\eta}_1\hat{L} - \hat{\kappa}_1\hat{R}, & RS - \hat{v}_2\hat{C} - \hat{\eta}_2\hat{L} - \hat{\kappa}_2\hat{R} \end{Bmatrix} \quad (3)$$

The other four, involving the back sum/difference channels SS and DS are $$\begin{Bmatrix} SS, & DS \\ SS - \hat{v}_1\hat{C}, & DS - \hat{v}_2\hat{C} \\ SS - \hat{\eta}_1\hat{L} - \hat{\kappa}_1\hat{R}, & DS - \hat{\eta}_1\hat{L} - \hat{\kappa}_1\hat{R} \\ SS - \hat{v}_1\hat{C} - \hat{\eta}_1\hat{L} - \hat{\kappa}_1\hat{R}, & DS - \hat{v}_2\hat{C} - \hat{\eta}_2\hat{L} - \hat{\kappa}_2\hat{R} \end{Bmatrix} \quad (4)$$

In the above coding modes, the terms that are subtracted from the input and sum/difference channels L, R, C, S, D, LS, RS SS and DS are, indeed, the predicted values thereof. More specifically, as can be seen, the prediction for a particular input channel or sum/difference channel is derived from at least one other, "predicting" channel. For the front channels, C is illustratively used as a predicting channel for L, R, S and D, while L and R are used jointly as predicting channels for C. For the back channels, all three front channels are illustratively used as predicting channels for LS, RS, SS and SD, either by themselves or in various combinations. The "^" over the predicting channels, e.g., $\hat{C}$, denotes that the predictions are based on the encoded values of the predicting channels—generated by quantizer/rate loop processor 206 and fed back to composite coder 205 over lead 216—rather than their actual values. The reasoning behind this is as follows: Firstly, the encoded predicting channel serves as virtually as good a predictor as the unencoded channel so there is no harm done by doing this. It is noted, however, that the predicted value of each encoded channel has to be added back in the decoder. That is, L is recovered from the transmitted L–$\hat{\alpha}\hat{C}$ by adding $\hat{\alpha}\hat{C}$ to that which is received. It is only $\hat{C}$, and not C, that is available in the decoder. We are thus able to add back to the received coded channel in the decoder that which was subtracted from it in the coder. If the unencoded predicting channel were used in the coder, a quantization noise artifact would, disadvantageously, be introduced in the decoder.

The scalar prediction coefficients $\hat{\alpha}$, $\hat{\beta}$, etc may be computed using a variety of different criteria. In the simplest implementation, these may all be set to "1" or some other constant less than "1". Indeed, some of those coefficients could be set to zero if the prediction of which they are a part is expected to be very small. This would be the case, for example, for the the prediction of a difference matrixed channel, such as D or DS, because those matrixed channels are, themselves, expected to have near-zero values.

In a slightly more complex system, the prediction coefficients may be computed for each block (but only one set of coefficients being computed for all coder bands), using a minimum mean squared error (mmse) or a perceptually weighted mmse criterion, and transmitted as part of the bitstream that is output by quantizer/rate loop processor 206 (the composite coding decision still being independent for each of the coder bands). The reason that the coefficients are denoted with a "^", e.g., $\hat{\alpha}$, is that if their values are computed, rather than being constants, those values are necessarily coded, i.e., quantized, when stored or transmitted in digital form, the "^" notation being indicative of this. In a yet more complex system, the prediction coefficients are estimated separately for each of the coder bands. Such a scheme is attractive when prediction gain is low because of time delays between different channels. However, transmitting prediction coefficients for each of the coder bands can be quite expensive. Fortunately, experiments suggest that coefficients from the previous block may be used with a relatively small loss in prediction gain. The prediction coefficients in such a system can therefore be computed in a backward fashion from the decoded values of the previous block both at the encoder and the decoder.

As seen from (1), (2), (3) and (4) above, sum/difference channels are formed only between pairs of front channels or pairs of back channels. More complex combinations, or "basis transformations",—involving perhaps three or more input channels and/or involving, perhaps, sums and differences between front and back channels—might prove advantageous from a compression point of view. Precluding such more complex basis transformations, however, is preferred because we then ensure that quantization noise masking—which is a driving principle of perceptual coding—is effective not only in a five-speaker listening room environment but also in the case of a so-called stereo downmix of the five input channels into two channels for headphone reproduction, for example. Moreover, the more complex basis transformations will usually require the use of lower noise thresholds (discussed below) for encoding, thereby reducing the amount of compression that is achieved.

We now address the questions of a) how the encoding of the five matrixed channels of any particular coding mode is carried out, and b) how the decision is made as to which mode is to be used in order to encode a particular coder band for a given block.

In particular, the Johnston patent describes how, for each block, the perceptual model processor generates for each coder band a noise threshold for each matrixed channel, that threshold being a critical parameter for the quantizer/rate loop processor in its encoding of the respective matrixed channel. For each coder band for a two-channel system, then, four noise thresholds are available, one each for L, R, S and D. The noise thresholds are supplied by perceptual model processor 204 to composite coder 205 via lead 214. When L and R are the encoded channels for a particular coder band during one coding mode of the Johnston patent, their respective thresholds are used to encode those channels. Similarly, when S and D are the encoded channels during the other coding mode, their respective thresholds are used to encode those channels.

In the present illustrative embodiment, nine thresholds per coder band are available. They are the thresholds corresponding to the five input channels L, R, C, LS and RS and the four sum/difference channels S, D, SS and DS. Obviously, when the selected coding mode includes an input channel or sum/difference channel as one of the matrixed channels, the corresponding threshold is used. Additionally, the threshold associated with a particular input or sum/difference channel is to be used to encode each predicted version of that channel. For example, the threshold for L is also used for the matrixed channel L–$\hat{\alpha}\hat{C}$. The manner in which the nine thresholds are generated for each coder band during each block is a straightforward application of the techniques described in the Johnston patent for the generation of its four thresholds and thus further elucidation on this point is not needed.

Figure 3:
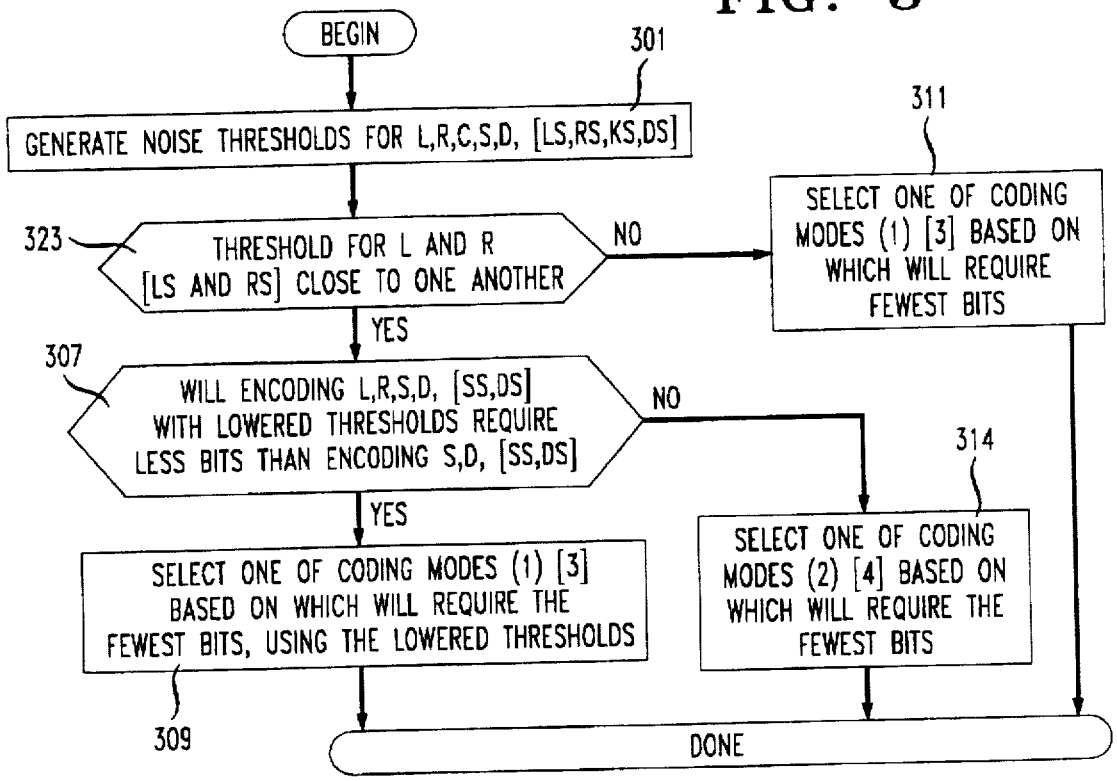
FIG. 3 is a flowchart of a process performed within the perceptual audio coder; the invention.

The manner in which a particular coding mode is selected is illustrated by the flowchart of FIG. 3. The flowchart represents the processing carried out in this regard for the front channels and for a particular coder band. Similar processing is carried out individually for both the front and back channels for each of the coder bands. Specifically, the items in [] relate to the processing carried out for the back channels.

Initially, the aforementioned nine thresholds are generated by perceptual model processor 204 (block 301). A decision is then made in composite coder 205 as to whether the coding mode for the front channels should be of a type that involves input channels or sum/difference channels, i.e., one of modes (1) or one of modes (2). One criterion that can be employed in making this decision is to compare the thresholds for L and R (block 303). If they differ by more than a predetermined amount, e.g., 2 dB, input channel coding is used i.e., one of the three modes in (1) (block 311). If they do not differ by more than the predetermined amount, one approach, which is not implemented here is to immediately choose sum/difference coding i.e., one of the three modes in (2). Here, however, a more sophisticated approach is used. In particular, we recognize that the use of sum/difference matrixed channels is desirable when L and R are highly correlated not only a) because a high degree of compression will be achieved in that case, but also b) because it will control so-called noise localization. Noise localization control can also be achieved, however, by suitably lowering the thresholds for L and R and, as it turns out, encoding L and R with those lowered thresholds sometimes requires fewer bits than encoding S and D. Thus one can use, for example, a "perceptual entropy" criterion as taught in the prior art to determine which approach—coding L and R with lowered thresholds or encoding S and D—will require the fewer number of bits. Once the coding mode has been narrowed to being from (1) or (2) (block 307), the particular coding mode to be used is selected simply by, again, using the aforementioned perceptual entropy criterion to identify the mode that requires the smallest number of bits (block 309 or block 314). A similar process is carried out vis-a-vis the back channels and an indication of which coding mode was used for both the front and back channels is stored or transmitted along with the encoded channels themselves.

The present invention relates to the generation of the thresholds for the five input channels and the four sum/difference channels. The invention, in particular, uses a so-called global masking threshold to take advantage of the masking ability of the signal component in the matrixed channel whose signal component is the strongest to mask the noise in the other matrixed channels.

In order to explain the invention, we begin by considering that in coder 104, as in the coders known in the prior art, a so-called "bit reservoir" is maintained which is basically a count of excess channel capacity measured in bits. That count, in essence, is a measure of the difference between a) the number of bit transmission slots available in the past at the average output bit rate and b) the number of bits that were actually encoded. The maximum size of the count in the bit reservoir depends on the amount of buffering (latency) allowed in the system. This unused capacity can be used to deal with the fact that future blocks may require a higher-than-average number of bits to represent the content of those blocks. Thus a relatively constant output bit rate can be supported even though the number of encoded bits generated for each block varies from block to block and will, in general, be sometimes higher than that rate (on a per/second averaged basis) and sometimes lower. Typically, the bit reservoir capacity is five times the average bit rate per block.

If the bit reservoir reaches its maximum capacity, this is an indication that the bit requirement has been consistently lower than the average output bit rate—so much so that it is advantageous to use up such excess capacity by lowering the noise thresholds, thereby performing a finer quantization. This is advantageous in that it provides better quality reproduction. It is, however, optional, the alternative being to simply send mark, or other non-information-bearing bits.

A technique is, however, definitely required to deal with the case when the bit reservoir becomes empty because at that point, unless remedial steps are taken, the buffering capacity of the system will have been all used up and encoded bits will begin to be lost. The prior art deals with this problem by switching to a coarser quantization once a) the bit reservoir is depleted, and b) in addition, the bit requirement for the current block exceeds the average output bit rate per block at that time. Implementationally, this is effected by iteratively multiplying each of the noise thresholds by a series of increasing constant values greater than 1 and recalculating the bit requirement until such time as the bit requirement for the current block can be accommodated. Once the bit requirements of future blocks goes below the average rate, the normal threshold values can again be used and the bit reservoir will begin to replenish.

While this prior art approach is effective in dealing with the bit reservoir depletion issue, it can lead to severe artifacts in the decoded signal since the mechanism for increasing the thresholds is deterministic across the coder bands rather than being, as we have realized is advantageous, based on psycho-acoustic considerations.

In accordance with the present invention, an approach to the bit reservoir depletion which takes psycho-acoustic considerations into account is used. That approach establishes a "global masking threshold" for each coder band which is constant across all five matrixed channels. The value of the global masking threshold is computed as described below. For the present it suffices to indicate that it represents the maximum noise level in any of the channels that will not be noticed by a listener in a listening room environment.

Figure 4:
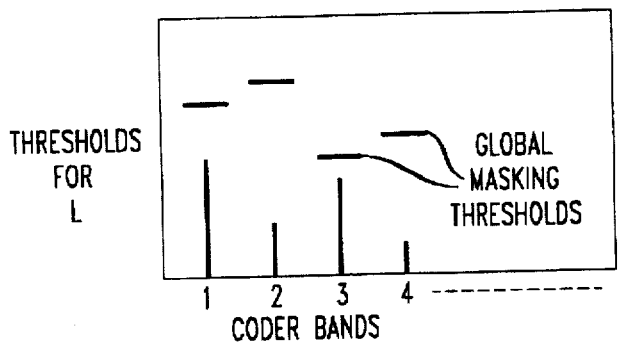
FIGS. 4–6 illustrate the principles of the present invention.
Figure 6:
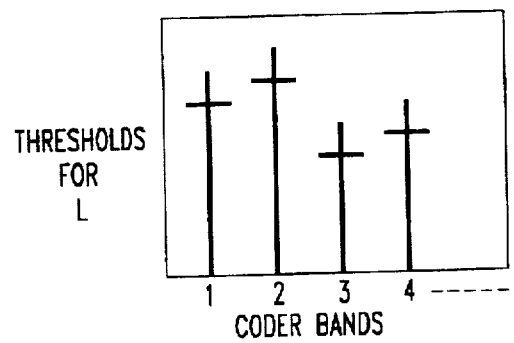
Figure 5:
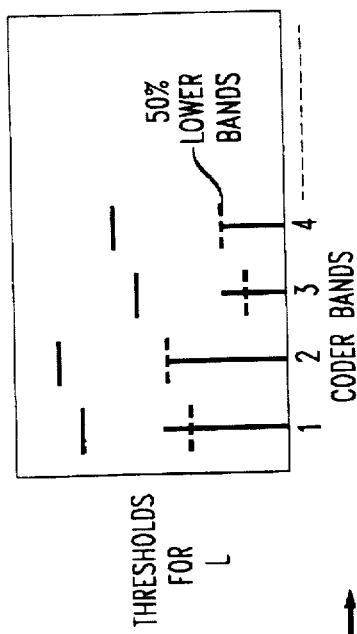

The manner in which the global masking threshold is used to control the noise threshold values in the event of imminent bit reservoir depletion is illustrated in FIGS. 4–6. FIG. 4, in particular, shows the threshold level for, illustratively, the first four coder bands of L, as well as the global masking threshold established for each of the bands. (A similar representation can be made for each of the other channels.) It is assumed that at the point in time represented by FIG. 4, the bit reservoir is just below a level of 80% depletion. Thus the standard threshold values are used. As soon as the depletion level reaches 80%, however, a lower bound for each of the thresholds of, illustratively, 50% of the global masking threshold is employed so that any threshold which is less than that lower bound is increased so as to be equal to it. Since a different global masking threshold is established for each coder band and the noise threshold is different for each band, this means that some of the thresholds will be increased more than others and some may not be increased at all. This is illustrated in FIG. 5 where it can be seen that the threshold for coder bands 1 and 3 have not been increased while those for coder bands 2 and 4 have. This approach is advantageous in that although additional noise is introduced as a consequence of increasing the thresholds, such additional noise is introduced in coder bands in which the possibility of it being detected by the listener is the lowest. The operative mechanism here is explained at a more opportune point hereinbelow.

If at a subsequent time it is observed that the bit reservoir reaches an even more severe state of depletion, a higher percentage of the global masking threshold, e.g. 75%, is established as the lower bound, causing a further increase in various ones of the thresholds. If, ultimately, the lower bound needs to be established at the full global masking threshold and bit reservoir depletion still continues, each of the thresholds is further increased to a value given by a constant >1 times the relevant global masking threshold value, thereby continuing to implement psycho-acoustic considerations in the setting of the thresholds-at least to some extent. This is illustrated in FIG. 6. Once the bit reservoir begins to rebuild, lower and lower percentages of the global masking threshold come into effect for determining the noise threshold lower bounds until, at the 80% point, the thresholds return to their standard values.

The actual value of the global masking threshold for each coder band is taken to be the maximum of the five input channel thresholds for that band minus a safety margin. The safety margin, in turn, is taken to be the frequency dependent binaural masking level difference, or MLD, as defined in the Johnston patent, plus a constant 4-5 dB.

Given that the value of the global masking threshold is determined in this way, we are now in a position to understand why the approach described above is effective. What is happening here is that the technique takes advantage of the masking ability of the signal component in the matrixed channel whose signal component is the strongest to mask the noise in the other matrixed channels.

There are at least two reasons why only a percentage of the global masking threshold is initially used to establish the noise threshold lower bounds, rather than the full value (unless ultimately needed as described above). One reason is that if a full global threshold is used, then the noise may not be fully masked for all listeners in a listening room environment—particularly listeners who are close to the speakers. The other is that the probability that noise in the aforementioned stereo downmixed channels will not be fully masked increases with increasing percentage of the global masking threshold used to establish the aforementioned lower bounds.

Figure 7:
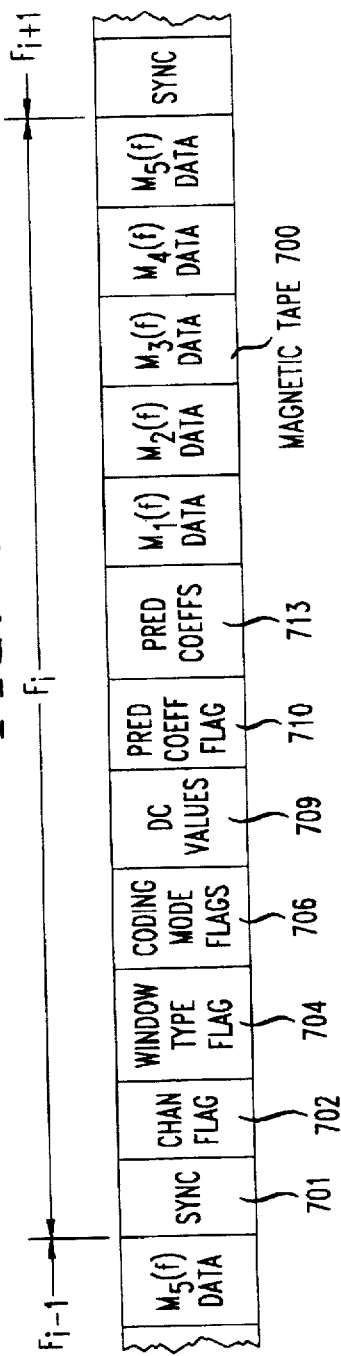
FIG. 7 shows the format of the PAC-encoded audio.

FIG. 7 shows a portion of a storage medium 700—illustratively magnetic tape—on which PAC-encoded data is stored and from which it can be subsequently read, decoded and presented to a listener as discussed above in connection with FIG. 1. The data is stored in frames ..., $F_{i-1}$, $F_i$, $F_{i+1}$, ..., each corresponding to one block of the input signal. The frames are stored sequentially on the storage medium and conform to a predetermined format that is very similar to that taught in the prior art for two-channel PAC. By way of example, the entirety of frame $F_i$ is explicitly shown in FIG. 7. It has the following fields: sync word 701 defining the start of the frame; channels flag 702 indicating the number of channels in the input signal—in this example, five; window type flag 704 indicating whether the frame represents a long or short window; coding mode flags 706 which indicate which of the fourteen encoding modes was used to encode the block in question in each of the coder bands, flags 706 being represented in Huffman coded form using a predefined codebook; dc values 709 specifying a respective dc value for each of the five matrixed channels; predictor coefficient flag 710 whose value, if "1", indicates that the prediction coefficients are explicitly specified within the frame, in which case they are provided in prediction coefficient field 713 and, if "0", indicates either that all the prediction coefficients have the value 1.0 or that they are to be computed in the decoder in the manner described hereinabove, the choice between these two options being predetermined when the system is designed; and PAC data fields 714–718 each containing the encoded data for a respective one of the (in this case) five matrixed channels, $M_1(f)$ ... $M_5(f)$. As in prior art, two-channel PAC systems, the PAC-encoded data in each one of fields 714–718 is, in turn, represented in Huffman-coded form. Various Huffman code codebooks are used to encode the data for the various coder bands within each channel and therefore the data in each of fields 714–718 also includes information identifying which codebooks were used to encode which coder bands of the matrixed channel in question.

It will be appreciated that the format shown in FIG. 7 could equally as well be used for storing the PAC frames in other types of storage media, such as compact disc, optical disc, semiconductor memory, etc.

Figure 8:
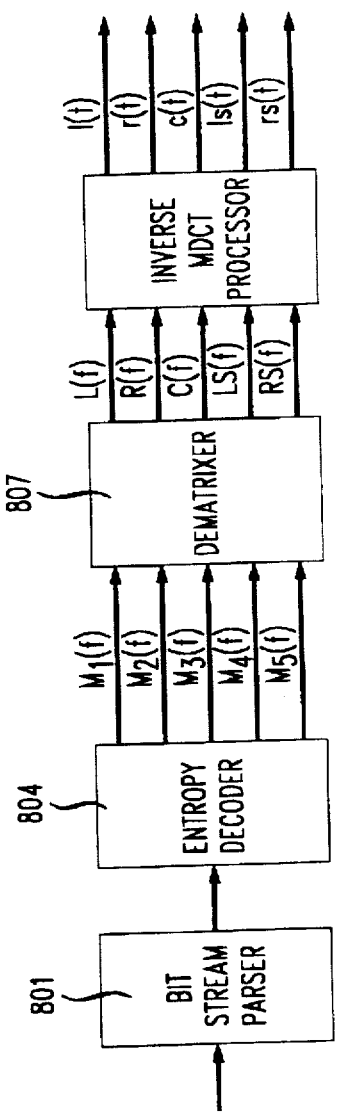
FIG. 8 is a block diagram of the perceptual audio decoder used in the system of FIG. 1.

FIG. 8 is an illustrative embodiment of PAC decoder 109 of FIG. 1. The incoming bit stream, formatted as a sequence of frames as shown in FIG. 7, is parsed into its various components by bit stream parser 801. Although not shown explicitly in FIG. 8, parser 801 not only presents the PAC-encoded data to the next functional block in the decoder—entropy decoder 804—but also supplies the various flags and other values described above in connection with FIG. 7 to each of the various components of the decoder that need them. (In similar fashion, it will be appreciated that although not explicitly shown in in FIG. 2, the flags and other values that may have been generated by various components of encoder 104, to the extent that they are not generated within quantizer/rate loop processor 106 itself, are supplied thereto so as to be able to be incorporated into the format of each frame.)

Continuing with the processing carried out by decoder 109, entropy decoder 804 performs the inverse function of entropy coder 208 and provides as its outputs the five matrixed channels $M_1(f)$ ... $M_5(f)$. Dematrixer 807 recovers from the matrixed channels the frequency domain input channels L, R, C, LS and RS, which are denoted, as in FIG. 2, as L(f), R(f), C(f), LS(f) and RS(f). The latter are then processed by Inverse Modified Discrete Cosine Transform (Inverse MDCT) processor 808 to produce the five time domain channels l(t), r(t), c(t), ls(t) and rs(t).

The processing performed by each of the elements shown in FIG. 8 as just described can be implemented straightforwardly and thus needs not be described in further detail. Indeed that processing is very similar to that carried out in the prior art for two-channel PAC.

The foregoing merely illustrates the principles of the present invention. Those skilled in the art will be able to devise numerous alternative arrangements which, although not explicitly shown or described herein, embody those principles and are thus within the spirit and scope of the invention.

We claim:

1. A method comprising the steps of:
   generating a plurality of matrixed channels in response to an audio signal comprising a set of input channels, each one of said matrixed channels being divided into a plurality of coder bands,
   generating a global masking threshold for each coder band, said global masking threshold having a constant value across a particular one of said coder bands of each of said matrixed channels,
   perceptually encoding said plurality of matrixed channels, said encoding step including (a) selecting a noise threshold value, for each coder band of each said matrixed channel, based upon noise masking criteria and (b) using said noise threshold value to control the coarseness of a quantization step size for said each coder band, and
   controlling a rate of bits that are output by said perceptually encoding step by adjusting at least one said selected noise threshold value as a function of said global masking threshold generated for the coder band for which said noise threshold was selected.

2. The method of claim 1 wherein in said controlling step any said noise threshold which is less than a particular threshold level is adjusted to equal said particular threshold level, said particular threshold level being derived as a predetermined percentage of said global masking threshold.

3. The method of claim 1 further comprising the step of:

applying said bits to a transmission medium having bit transmission slots and increasing said one selected noise threshold value in said adjusting step whenever the number of said bit transmission slob available to transmit said bits is less than a predetermined level.

4. The method of claim 2 wherein said global masking threshold for a particular coder band is a function of the maximum noise threshold value selected across said matrixed channels for said particular coder band.

5. The method of claim 4 wherein said global masking threshold for a particular coder band is a further function of a frequency dependent binaural masking level difference.

6. An apparatus comprising:

means for generating a plurality of matrixed channels in response to an audio signal comprising a set of input channels, each one of said matrixed channels being divided into a plurality of coder bands, means for generating a global masking threshold for each coder band, said global masking threshold having a constant value across a particular one of said coder bands of each of said matrixed channels, means for perceptually encoding said plurality of matrixed channels, said encoding step including (a) selecting a noise threshold value, for each coder band of each said matrixed channel, based upon noise masking criteria and (b) using said noise threshold value to control the coarseness of a quantization step size for said each coder band, and means for controlling a rate of bits that are output by said perceptually encoding step by adjusting at least one said selected noise threshold value as a function of said global masking threshold generated for the coder band for which said noise threshold was selected.

7. The apparatus of claim 6 wherein in said means for controlling any said noise threshold which is less than a particular threshold level is adjusted to equal said particular threshold level, said particular threshold level being derived as a predetermined percentage of said global masking threshold.

8. The apparatus of claim 7 further comprising:

means for applying said bits to a transmission medium having bit transmission slots and increasing said one selected noise threshold value in said adjusting step whenever the number of said bit transmission slots available to transmit said bits is less than a predetermined level.

* * * * *